United States Patent
Dubeyko et al.

(10) Patent No.: US 11,693,986 B1
(45) Date of Patent: Jul. 4, 2023

(54) ACCESSING USER ACCOUNTS AND DATA FROM ANY COMPUTING DEVICE

(71) Applicants: Lemon Inc., Grand Cayman (KY); Beijing Youzhuju Network Technology Co., Ltd., Beijing (CN)

(72) Inventors: Viacheslav Dubeyko, Los Angeles, CA (US); Jian Wang, Beijing (CN)

(73) Assignees: Lemon Inc., Grand Cayman (KY); Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 17/877,662

(22) Filed: Jul. 29, 2022

(51) Int. Cl.
  *G06F 21/62* (2013.01)
  *H04L 9/40* (2022.01)
  *G06F 21/60* (2013.01)
  *H04L 29/06* (2006.01)

(52) U.S. Cl.
  CPC ........ *G06F 21/6218* (2013.01); *G06F 21/604* (2013.01); *H04L 63/0838* (2013.01); *H04L 63/0861* (2013.01); *H04L 63/105* (2013.01)

(58) Field of Classification Search
  CPC .... G06F 21/6218; G06F 21/604; G06F 21/42; G06F 21/44; G06F 21/45; H04L 63/0838; H04L 63/105; H04L 63/0807; H04L 63/10
  See application file for complete search history.

(56) References Cited

U.S. PATENT DOCUMENTS

| | | | | |
|---|---|---|---|---|
| 8,752,146 B1* | 6/2014 | van Dijk | ............. | H04L 63/0861 713/184 |
| 2009/0042540 A1* | 2/2009 | Bodnar | ............. | H04N 5/23293 455/410 |
| 2010/0217850 A1* | 8/2010 | Ferris | ..................... | H04L 63/20 726/1 |
| 2012/0233678 A1* | 9/2012 | Pal | ......................... | H04L 9/321 726/7 |

* cited by examiner

*Primary Examiner* — Edward Zee
(74) *Attorney, Agent, or Firm* — BakerHostetler

(57) ABSTRACT

The present disclosure describes techniques for accessing user accounts and data from any computing device. It may be determined whether an account of a user exists in a cloud service in response to receiving information associated with the user from any computing device. Data associated with the account may be stored by the cloud service. There may be a plurality of types of data associated with a plurality of security levels. The plurality of security levels may correspond to different security requirements. The data associated with the account may belong to at least one of the plurality of types of data. An instance of the account may be deployed to the computing device in response to determining that the account exists in the cloud service. The instance of the account may enable the user to access services via the computing device.

17 Claims, 12 Drawing Sheets

900

Determine whether an account of a user exists in a cloud service in response to receiving information associated with the user from a computing device 902

Deploy an instance of the account to the computing device in response to determining that the account exists in the cloud service, wherein the instance of the account enables the user to access services via the computing device 904

Cause to temporarily store the instance of the account at the computing device 906

Cause to delete the instance of the account from the computing device after a predetermined amount of time has lapsed 908

FIG. 9

ACCESSING USER ACCOUNTS AND DATA FROM ANY COMPUTING DEVICE

BACKGROUND

Technology increasingly permeates users' everyday lives. New technologies continue to be developed and existing technologies continue to be improved. Improved techniques for accessing user account and data are desirable.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 9 illustrates another example process for accessing a user account in accordance with the present disclosure.

DETAILED DESCRIPTION OF ILLUSTRATIVE EMBODIMENTS

As modern technology continues to advance, individuals are increasingly likely to own and/or use multiple different devices. Similarly, a single device is increasingly likely to be owned and/or used by multiple different individuals. Devices are also likely to be replaced with newer, improved devices at an increasing frequency. Each time an individual uses or acquires a new or different device, the individual may need to create a new account, install applications, and/or manage settings of the device. Such a process is both inefficient and resource consuming, especially in a business environment. In some instances, performing such a process on a large-scale for a business is nearly impossible.

Figure 1:
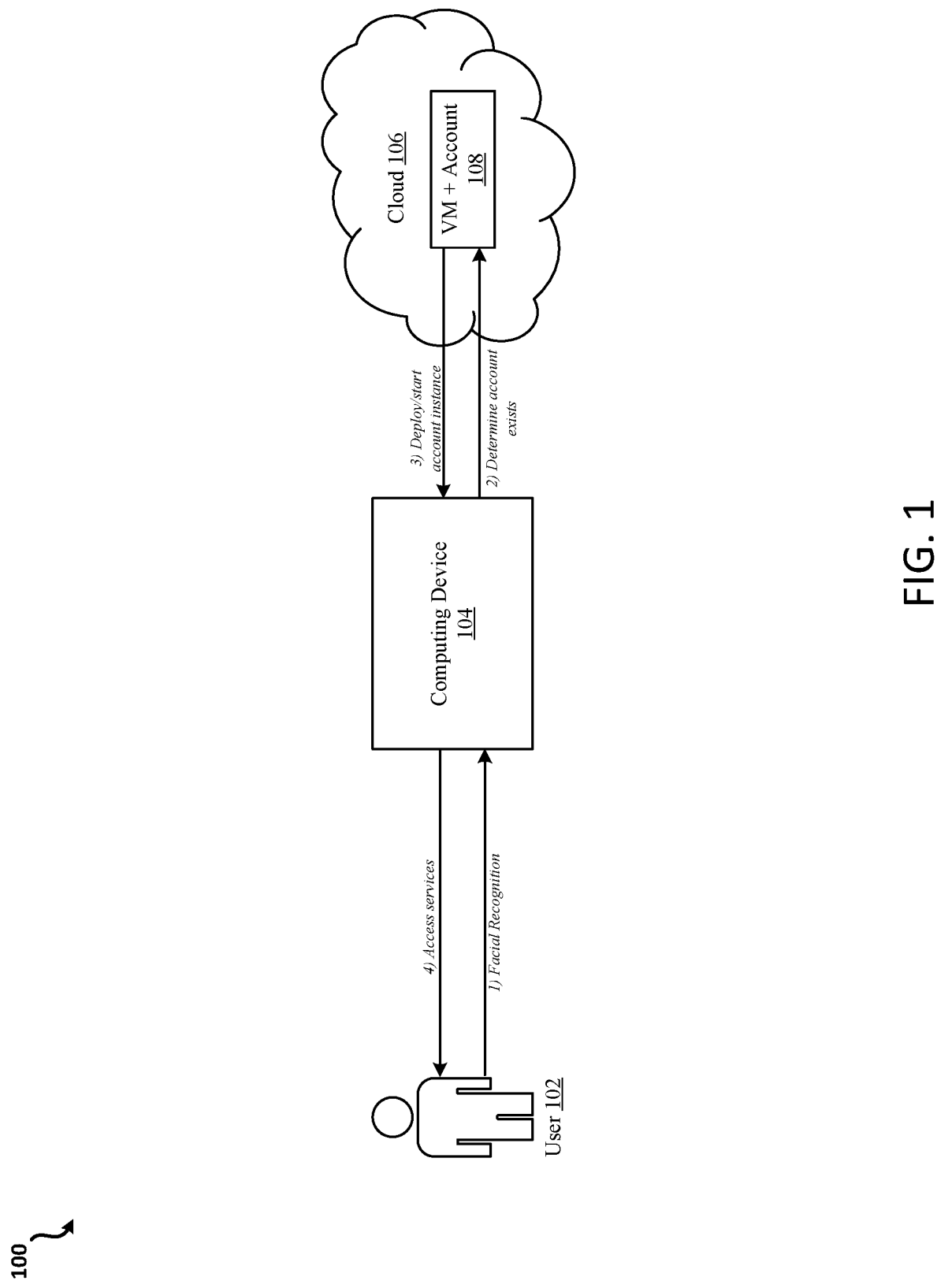
FIG. 1 illustrates an exemplary diagram illustrating a user accessing a user account from a computing device in accordance with the present disclosure.

FIG. 1 illustrates an exemplary diagram 100 illustrating a user 102 accessing a user account from a computing device 104 in accordance with the present disclosure. The computing device 104 may comprise any type of computing device, such as a mobile device, a tablet device, laptop, a desktop computer, a smart television, or other smart device (e.g., smart watch, smart speaker, smart glasses, smart helmet), a gaming device, a set top box, digital streaming device, robot, and/or the like. The computing device 104 may be associated with one or more users. For example, the one or more users may be co-workers or colleagues. As another example, the one or more users may be friends, students, or any other group of people that want to or need to communicate with one another.

Facial recognition or identification (ID) information associated with the user 102 may be utilized to access the user account from any computing device. Facial identification is capable of uniquely identifying any person in the world. Thus, the user 102 may use facial identification to identify and access his or her user account and data associated with the user account. For example, at numeral 1 of FIG. 1, the user 102 may use one or more cameras associated with the computing device 104 to scan or take images of his or her facial features. Such facial features may be utilized to recognize the user 102. In some embodiments, geolocation and/or complimentary authentication services may additionally be utilized to double check the identity of the user 102.

After the identity of the user 102 is recognized, such as via facial identification, the user account corresponding to the user's identity may be identified. In embodiments, a corresponding user account instance is already available locally (e.g., on a storage of the computing device 104), the user session may be initialized (e.g., started) locally on the computing device 104 using the local account instance.

In other embodiments, a corresponding account instance is not available locally. In the example of FIG. 1, at numeral 2, the computing device 104 may communicate with a server service remote to the computing device 104 (e.g., a cloud service 106) to determine if the user account exists in the server service, such as in the cloud service 106. The server service, such as the cloud service 106, may comprise and/or provide a variety of types of computing-related resources, such as executing virtual machine (VM) instances and/or containers, data/storage resources, and so on.

To determine if the user account exists in the remote service, such as in the cloud service 106, the computing device 104 may send a query or request to the remote service. The query or request may include and/or be accompanied by the facial identification data received at the computing device 104. The remote service may receive the query or request, along with the facial identification data. In response to receiving the query or request, it may be determined whether the corresponding user account exists in the remote service. For example, the cloud service 106 may determine whether the user account exists in a storage resource of the cloud service 106.

In embodiments, it may be determined that the user account exists in the cloud service 106. For example, the cloud service 106 may determine that there exists a cloud-based container or virtual machine (VM) 108 associated with the user account. If the remote service determines that the user account exists in the remote service, the remote service may send an indication (e.g., response to the query or request) to the computing device 104. The indication may indicate that the user account exists in the remote service. At numeral 3, the remote service may deploy an instance of the user account to a local storage of the computing device 104. After the remote service deploys the instance of the user account to the computing device 104, the user may be able to access data and/or services associated with the user account via the computing device 104.

The remote service, such as the cloud service 106, may be located at a data center, such as a single premise, or be distributed throughout different geographic locations (e.g., at several premises). The cloud service 106 may be in communication with and/or interact with the computing device 104 via one or more networks. The network(s) facilitating the communication between the computing device 104 and the cloud service 106 may comprise a variety of network devices, such as routers, switches, multiplexers, hubs, modems, bridges, repeaters, firewalls, proxy devices, and/or the like. The network(s) facilitating the communication between the computing device 104 and the cloud service 106 may comprise wireless links, such as cellular links, satellite links, Wi-Fi links and/or the like.

In embodiments, the user account instance may exist on the computing device 104 for a certain period, such as until a threshold in time. The threshold in time may vary. For example, the user account instance may remain available locally for 24 hours so that a user can use the same computing device 104 during the same day. In other examples, the user account instance may remain available locally for 7 days such that a user may use the same computing device 104 during the week. Any other threshold of time may be suitable. If the local container with the user account instance has not been used for some time (e.g., for a day, for a week, for a month, etc.), then the local account instance may automatically be deleted.

The above-described techniques provide a flexible and easy way for a user to access their already-created user account on a variety of different devices, without the user needing to create and to set up the account and environment for every new or different device. For example, the user 102 can employ any computing device, including the computing device 104, to access the user account and services on a facial identification basis, without having to re-create and set up the account. The data and services associated with the user account may be available quickly on any device by using the above-described facial identification approach.

Figure 2:
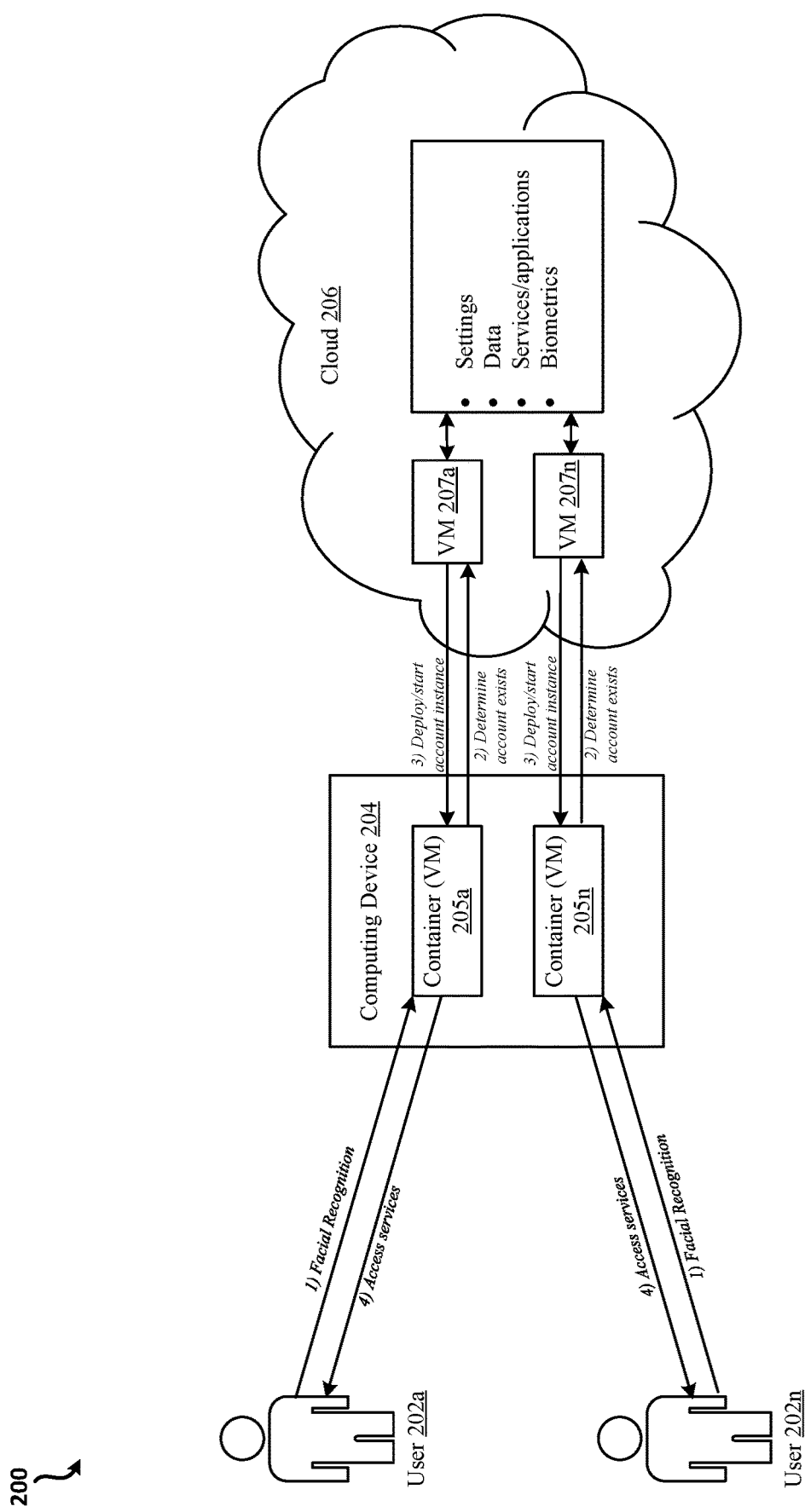
FIG. 2 illustrates an exemplary diagram illustrating multiple users accessing user accounts from a computing device in accordance with the present disclosure.

FIG. 2 illustrates an exemplary diagram 200 illustrating a plurality of users 202a-n accessing their respective user accounts via a computing device 204 in accordance with the present disclosure. Each of the plurality of users 202a-n may access their respective user accounts at different times using the same computing device 204. For example, the user 202a may use the computing device 204 at a first time to access a user account of the user 202a. The user 202n may use the computing device 204 at a second or later time to access a user account of the user 202b. The computing device 204 may comprise any type of computing device, such as a mobile device, a tablet device, laptop, a desktop computer, a smart television, or other smart device (e.g., smart watch, smart speaker, smart glasses, smart helmet), a gaming device, a set top box, digital streaming device, robot, and/or the like. The computing device 204 may be associated with the plurality of users 202a-n. For example, the plurality of users 202a-n may be co-workers or colleagues. As another example, the plurality of users 202a-n may be friends, students, or any other group of people that want to or need to communicate with one another.

In embodiments, the computing device 204 may utilize facial identification of the users 202a-n to identify a user account corresponding to each of the users 202a-n. At numeral 1, each of the users 202a-n may use one or more cameras associated with the computing device 204 to scan or take images of his or her facial features. Such facial features may be utilized to recognize the users 202a-n. For example, the facial identification data received from the user 202a may be used, such as by the computing device 204, to identify the user 202a and determine the account instance corresponding to the user 202a. Likewise, the facial identification data received from the user 202n may be used, such as by the computing device 204, to identify the user 202n and determine the account instance corresponding to the user 202n. In some embodiments, geolocation and/or complimentary authentication services may additionally be utilized double check the identity of the users 202a-n.

After the identity of any of the users 202a-n is recognized, such as via facial identification, the user account corresponding to that user's identity may be identified, such as by the computing device 204. In embodiments, a corresponding user account instance may already be available locally (e.g., on the computing device 204), and the user session may therefore be initialized (e.g., started) locally on the computing device 204 using the user account instance.

In other embodiments, the corresponding account instance is not available locally. In the example of FIG. 2, at numeral 2, the computing device 204 may communicate with a server service remote to the computing device 204 (e.g., a cloud service 206) to determine whether a corresponding user account exists in the server service, such as in the cloud service 206. The remote service, such as the cloud service 206, may comprise and/or provide a variety of types of computing-related resources, such as executing virtual machine (VM) instances and/or containers, data/storage resources, and so on.

To determine if the user account is in the remote service, such as in the cloud service 206, the computing device 204 may send a query or request to the remote service. The query or request may include and/or be accompanied by the facial identification data received at the computing device 204. The remote service may receive the query or request, along with the facial identification data. In response to receiving the query or request, the remote service may determine whether the corresponding user account exists in the remote service. For example, the remote service may determine whether the user account exists in a storage resource of the remote service.

In embodiments, the remote service determines that the user account exists in the remote service. For example, the remote service may determine that a cloud-based container or virtual machine (VM) 207a-n associated with the user account exists in a storage of the remote service. If the remote service determines that the user account exists in the remote service, the remote service may send an indication (e.g., response to the query or request) to the computing device 204. The indication may indicate that the user account exists in the remote service. At numeral 3, the remote service may deploy an instance of the user account to the computing device 204. After the remote service deploys the instance 205a-n of the corresponding user account to the computing device 204, a user session may be initialized on the computing device 204. After the user session is initialized on the computing device 204, at numeral 4, the user may be able to access data and/or services associated with the user account via the computing device 204.

Figure 3:
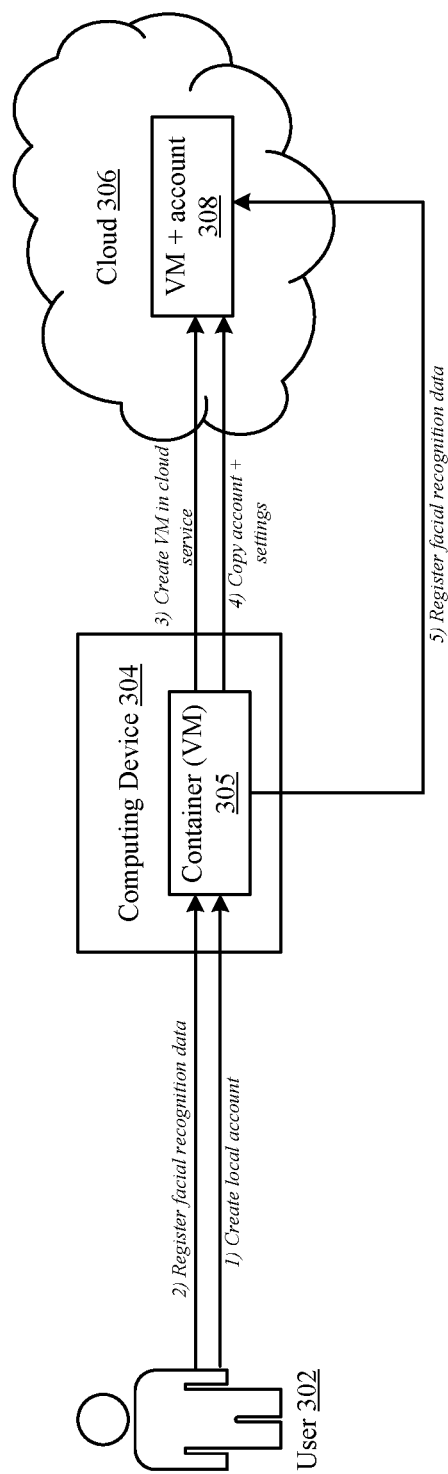
FIG. 3 illustrates an exemplary diagram illustrating user account creation in accordance with the present disclosure.

In some embodiments, a user may not have an existing user account. For example, the user may not be associated with a user account that is available locally or in a remote service. Thus, the user may first need to create a user account. FIG. 3 illustrates an exemplary diagram 300 illustrating user account creation in accordance with the present disclosure. A user account associated with the user 302 may not exist locally on the computing device 304 or in a remote service, such as a cloud service 306. This may occur if the user has never created an account on any device before. Alternatively, a user account associated with the user 302 may not exists if the user has previously created a user account, but that user account has been lost, corrupted, stolen, and/or compromised. Thus, the user 302 may need to create a new user account.

At numeral 1 of the example of FIG. 3, the user 302 may register and create an initial local user account on the computing device 304, such as in a local container 305. At numeral 2, the user 302 may register his or her facial identification data, such as with the local user account. To register his or her facial identification data, the user 302 may use one or more cameras associated with the computing device 304 to scan or take images of his or her facial features. Such facial features may later be utilized to recognize the user 302. Data associated with his or her facial features may be registered with the local user account.

The initial local user account, along with its corresponding data and settings may be saved into the remote service. The remote service, such as the cloud service 306, may comprise and/or provide a variety of types of computing-related resources, such as executing virtual machine (VM) instances and/or containers, data/storage resources, and so on. The initial local user account along with corresponding data and settings may be saved into a storage of the remote service. For example, the computing device 304 may cause the initial local user account and corresponding data/settings to be stored in a storage of the remote service, such as the cloud service 306. At numeral 3, a VM associated with the user account (or any other cloud-based container) may be created in a remote service, such as the cloud service 306. At numeral 4, data and/or settings associated with the user account may be stored into the cloud instance of the user account.

At numeral 5, the facial identification data associated with the user 302 may be registered with the remote service. For example, the facial identification data associated with the user account may be registered with the cloud service 306. The cloud-based container 308 may be used for deployment of the user account with settings into any computing device, including but not limited to the computing device 304. For example, the user 302 may later utilize any computing device to access his or her user account, even if such computing device does not include a local instance of the user account.

A user account, such as any of the user accounts described above, may contain or otherwise be associated with various data. The data associated with the user account(s) may be stored by a remote service, such as any of the remote services (e.g., cloud services) described above. Some types of data may be sensitive in nature. For example, access to certain types of data may be restricted and the certain types of data may be associated with certain levels of security requirement. There may be different security levels for accessing different types of data stored by the remote service. Each of the plurality of security levels may correspond to different security requirements that must be satisfied in order for a user to gain access to the corresponding data.

Figure 4:
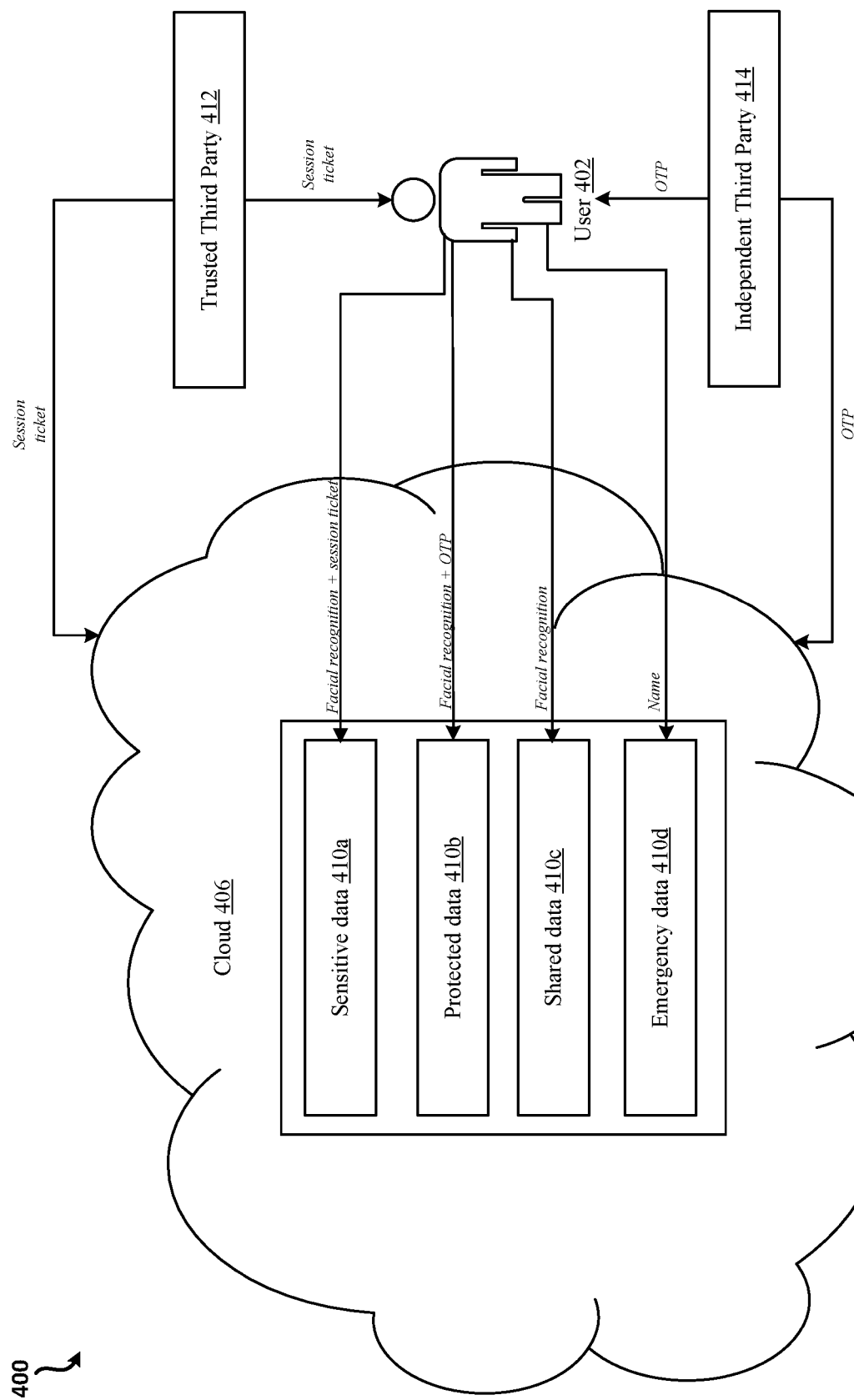
FIG. 4 illustrates an exemplary diagram illustrating accessing data associated with a plurality of security levels in accordance with the present disclosure.

FIG. 4 illustrates an exemplary diagram 400 illustrating accessing data associated with a plurality of security levels in accordance with the present disclosure. In the example of FIG. 4, the data stored by the remote service, such as in a storage of the cloud service 406, may be of at least one type: emergency data 410d, shared data 410c, protected (e.g., private) data 410b, and/or sensitive data 410a. Each of these data types may correspond to a different security level.

In embodiments, the emergency data 410b may be accessed, such as by the user 402, without any permissions (e.g., on a name basis only). For example, the user 402 may utilize any computing device to access the emergency data 410b. The name of the user 402 may be utilized to provide the user 402 with access to the emergency data 410b. In other embodiments, the name of the data file may additionally or alternatively be used to provide the user 402 with access to the emergency data 410b in the remote service. In other embodiments, facial identification data of the user 402 may additionally or alternatively be used to provide the user 402 with access to the emergency data 410b in the remote service.

In embodiments, shared data 410c may be accessed, such as by the user 402, using facial identification data only. For example, the user 402 may use one or more cameras associated with any computing device to scan or take images of his or her facial features (e.g., to generate facial identification data). Such facial identification data may be provided to the remote service, such as the cloud service 406. The remote service may determine if the received facial identification data corresponds to (e.g., matches) the facial identification data that is registered with a user account of the user 402. If the remote service determines that the facial identification matches, the remote service may determine that the user 402 has permission to access the shared data 410c. If the remote service determines that the user 402 has permission to access the shared data 410c, the user 402 will be able to gain access to the shared data 410c.

In embodiments, protected data 410b may be accessed, such as by the user 402, using facial identification and a one-time password (OTP). In some embodiments, the OTP may be generated by an independent third party 414. The independent third party 414 may be any automated service that can communicate with the remote service. For example, the independent third party 414 may be a CCTV camera service in communication with the remote service, such as the cloud service 406. The independent third party 414, such as the CCTV camera service, can identify the user 402 by means of facial recognition software. The independent third party 414 may automatically generate the OTP (without any user involvement) if the user 402 is recognized via the facial recognition software.

The independent third party 414 may then send the OTP to both the remote service (e.g., the cloud service 406) and a client computing device from which the user is trying to access the protected data 410b. The remote service and the user's computing device may interact with each other to determine whether the OTP received from the independent third party 414 by the cloud service 406 is the same as the one received by the user's computing device. If it is determined that the cloud service 406 and the user's computing device received the same OTP, the user 402 may be given access to the protected data 410b. For example, the cloud service 406 may give the user 402 access to the protected data 410b.

In embodiments, geolocation information may be used to determine the independent third party 414 that is used to verify that the user 402 has access to the protected data 410b. For example, the user's computing device via which he or she is trying to access the protected data 410b may identify a current geolocation of the user 402. The geolocation may be shared with the remote service, such as the cloud service 406. For example, the cloud service 406 may utilize the geolocation information to locate the nearest possible independent third party service 414, such as the nearest possible CCTV camera service. The nearest possible independent third-party service, such as the nearest possible CCTV camera service, may find the user 402 and identify him or her on the basis of facial recognition. As another example, any other independent identification service known to the remote service (e.g., the cloud service 406) may be used to verify the identity of the user 402. The user 402 may, for example, visit a bank office and the bank office may identify the user 402 using facial recognition techniques.

In embodiments, the sensitive data 410a may be accessed, such as by the user 402, using facial identification and a session ticket. The session ticket may be generated, for example, by a trusted third party 412. The trusted third party 412 may be any service known to the remote service, such as the cloud service 406. The trusted third party 412 may include both one or more automated components and one or more human verification components. The automated component(s) and the human verification component(s) may be utilized together to generate the session ticket. For example, any bank office may play the role of the trusted third party 412. The user 402 may visit any bank office and use an automated service (e.g., the ATM) and a human verification (e.g., bank personnel confirmation) to generate the session ticket.

The trusted third party 412 may then send the session ticket to both the remote service, such as the cloud service 406, and the user's computing device from which they are trying to access the sensitive data 410a. The remote service and the user's computing device may interact with each other to determine whether they each receive the same session ticket from the trusted third party 412. If it is determined that the remote service and the user's computing device received the same session ticket, the user 402 may be given access to the sensitive data 410a. For example, the remote service may give the user 402 access to the sensitive data 410a.

In embodiments, geolocation information may be used to determine the trusted third party 412 that is used to generate the session ticket. For example, the user's computing device from which they are trying to access the sensitive data 410a may identify a current geolocation of the user 402. The geolocation may be shared with the remote service, such as with the cloud service 406. The remote service may utilize the geolocation information to locate the nearest possible trusted third party 412. The nearest possible trusted third party 412 may be the one that is closest to the user's computing device based on the geolocation information. The nearest possible trusted third party 412, such as the nearest possible bank, may identify the user 402 on the basis of facial recognition techniques. As another example, any other independent service of identification known to the remote service may be used to verify the identity of the user 402.

In embodiments, a user account may be deleted from a remote service, such as any of the cloud services described above. For example, a user account may be deleted from the remote service if it is determined that the user account has been compromised and/or corrupted. As another example, a user account may be deleted from the remote service if the user associated with the user account wants to delete his or her user account from the remote service, such as a cloud service. The user account may be deleted based on, at least in part, information received from a third party (e.g., trusted third party 412). For example, the user account may be deleted using a session ticket generated by a trusted third party 412.

Figure 5:
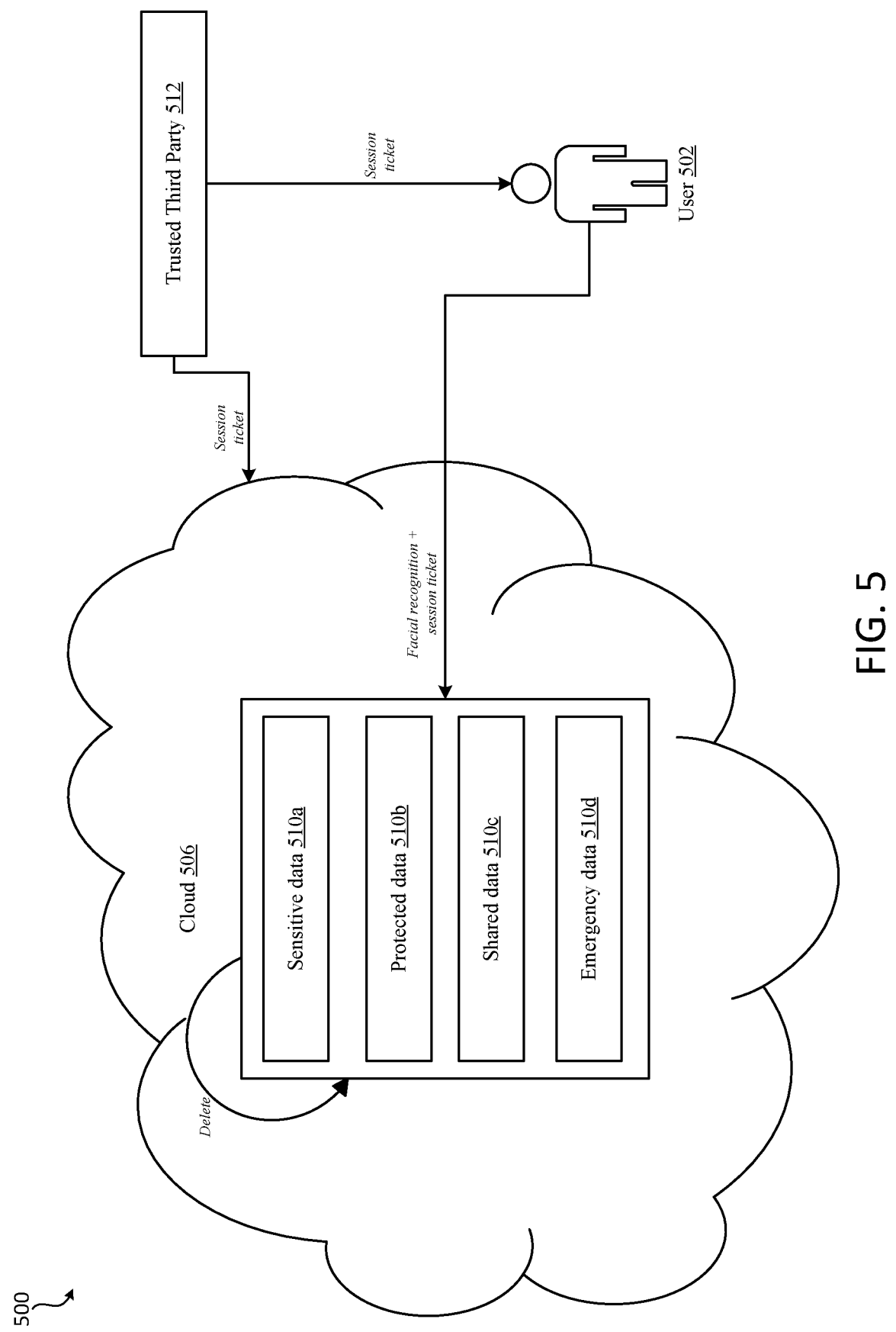
FIG. 5 illustrates an exemplary diagram illustrating user account deletion in accordance with the present disclosure.

FIG. 5 illustrates an exemplary diagram 500 illustrating user account deletion in accordance with the present disclosure. A user 502 may be associated with a user account in a remote service, such as a cloud service 506. The user account may be a user account that needs to be deleted (e.g., due to having been compromised and/or corrupted). Additionally, or alternatively, the user account may just be a user account that the user 502 wants to delete for any other reason.

To delete the user account, the operation of cloud account deletion can be used. A trusted third party 512 may be utilized to delete the account. The trusted third party 512 may be any third party service known to the remote service. The trusted third party 512 may include both one or more automated components and one or more human verification components. The automated component(s) and the human verification component(s) may be utilized together to generate a session ticket. For example, any bank office may play the role of the trusted third party 512. The user associated with the user account may visit a trusted third party 512 to generate a session ticket. For example, the user 502 may visit any bank office. At the bank office, the user 502 may use an automated service (e.g., the ATM) and a human verification (e.g., bank personnel confirmation) to generate the session ticket.

The trusted third party 512 may then send the session ticket to both the remote service, such as the cloud service 506, and a client computing device used by the user 502. The cloud service 506 and the user's computing device may interact with each other to determine whether they each receive the same session ticket from the trusted third party 512. If it is determined that the remote service and the user's computing device received the same session ticket, the user account associated with the user 502 may be deleted from the remote service. For example, the user account may be deleted from a storage of the remote service. For example, the remote service may delete all data associated with the user account that is stored in a storage of the remote service, including but not limited to emergency data 510d, shared data 510c, protected (e.g., private) data 510b, and/or sensitive data 510a.

Figure 6:
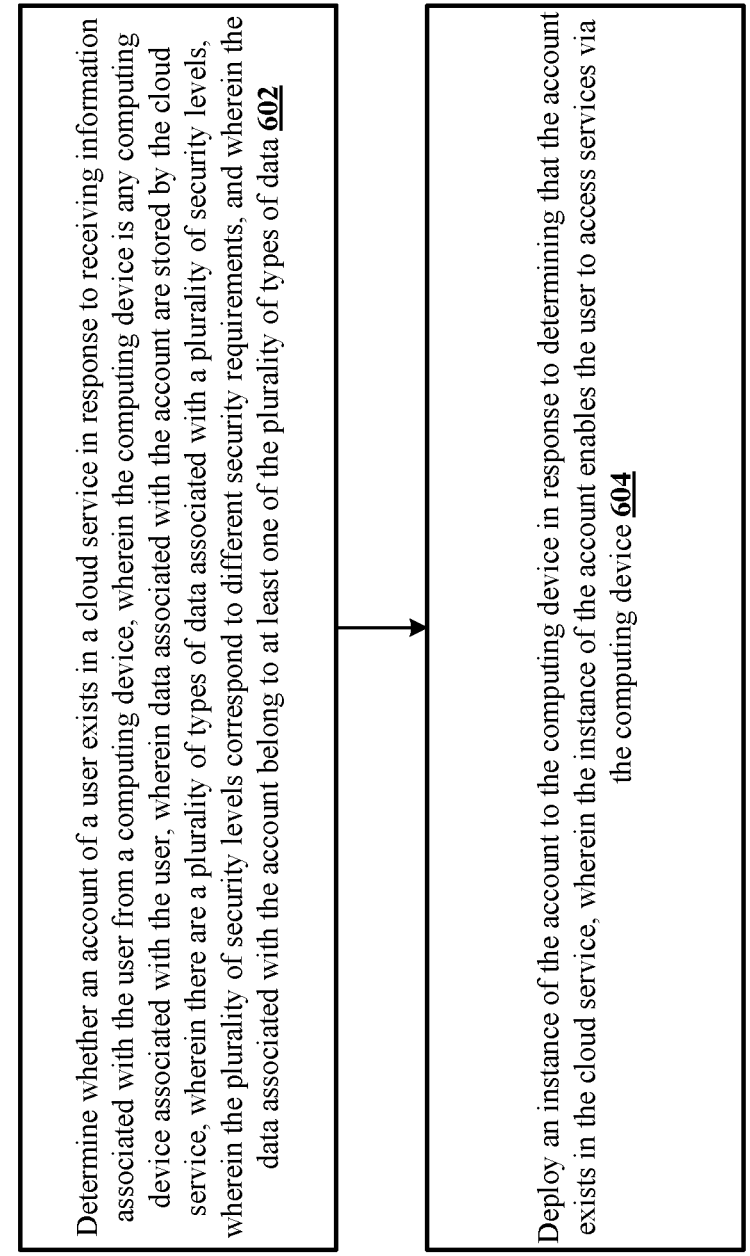
FIG. 6 illustrates an example process for accessing a user account in accordance with the present disclosure.

FIG. 6 illustrates an example process 600 performed by one or more components shown in the diagrams 100, 200, 300, 400, and/or 500. The process 600 may be performed to access a user account from any computing device. Although depicted as a sequence of operations in FIG. 6, those of ordinary skill in the art will appreciate that various embodiments may add, remove, reorder, or modify the depicted operations.

As described above, facial identification associated with a user may be utilized to access an account of the user from any computing device associated with the user. For example, facial identification may be used to identify and access his or her user account. The user may use one or more cameras associated with any computing device to scan or take images of his or her facial features. Such facial features may be utilized to recognize the user. In some embodiments, geolocation and/or complimentary authentication services may additionally be utilized double check the identity of the user.

After the identity of the user is recognized, such as via facial identification, the user account corresponding to the user's identity may be identified. In embodiments, the corresponding account instance is already available locally, and a user session may be initialized (e.g., started) locally on the computing device using the local user account instance. In other embodiments, the corresponding account instance is not available locally. Thus, it may be determined if the user account exists in a service remote to the computing device, such as in a cloud service. At 602, it may be determined whether an account of a user exists in a cloud service in response to receiving information (e.g., facial identification data) associated with the user from the computing device. The cloud service may determine if a corresponding user account exists based on the facial identification data received at the computing device.

The account may contain or otherwise be associated with various data. The data associated with the account may be stored by the cloud service. The data associated with the account may belong to at least one of a plurality of types of data. Some types of data may be sensitive in nature (e.g., have restricted access). Thus, the plurality of types of data may be associated with a plurality of security levels. The plurality of security levels may correspond to different security requirements that must be satisfied by a user in order for the user to gain access to the corresponding data.

It may be determined that the user account exists in the cloud service, such as in a storage of the cloud service. For example, the cloud service may determine that a cloud-based container or VM associated with the user account exists in the cloud service. If the cloud service determines that the user account exists in the cloud service, the cloud service may deploy an instance of the user account to the computing device. At 604, an instance of the account may be deployed to the computing device in response to determining that the account exists in the cloud service. If the instance of the account is deployed to the computing device, the user may utilize the computing device to access the data and/or services associated with the account.

Figure 7:
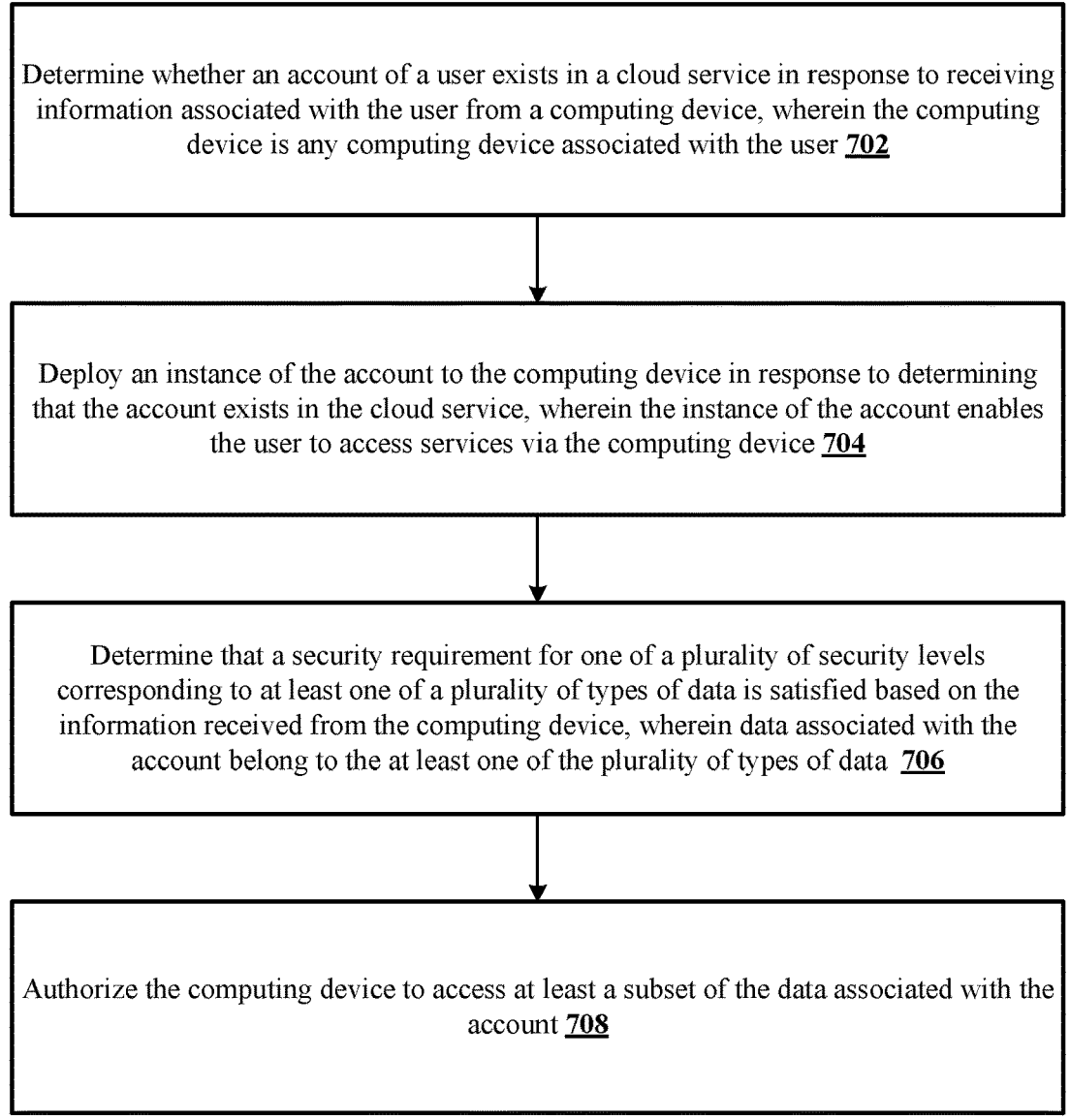
FIG. 7 illustrates another example process for accessing a user account in accordance with the present disclosure.

FIG. 7 illustrates an example process 700 performed by one or more components shown in the diagrams 100, 200, 300, 400, and/or 500. The process 700 may be performed to access a user account from any computing device. Although depicted as a sequence of operations in FIG. 7, those of ordinary skill in the art will appreciate that various embodiments may add, remove, reorder, or modify the depicted operations.

As described above, facial identification associated with a user may be utilized to access an account of the user from any computing device associated with the user. For example, facial identification may be used to identify a user account of the user. The user may use one or more cameras associated with any computing device to scan or take images of his or her facial features. Such facial features may be utilized to recognize the user. In some embodiments, geolocation and/or complimentary authentication services may additionally be utilized double check the identity of the user.

After the identity of the user is recognized, such as via facial identification, the user account corresponding to the user may be identified. In embodiments, a corresponding user account instance is already available locally, and a user session may be initialized (e.g., started) locally on a client computing device using the local user account instance. In other embodiments, the corresponding user account is not available locally. Thus, it may need to be determined if the user account exists in a service remote to the computing device, such as in a cloud service. At 702, it may be determined whether an account of a user exists in a cloud service in response to receiving information (e.g., facial identification data) associated with the user from the computing device. The cloud service may determine if the user account exists based on the facial identification data associated with the user received from the client computing device.

It may be determined that the user account exists in the cloud service, such as in a storage of the cloud service. For example, it may be determined that a cloud-based container or VM associated with the user account exists in the cloud service. If it is determined that the user account exists in the cloud service, the cloud service may deploy an instance of the user account to the computing device. At 704, an instance of the user account may be deployed to the client computing device used by the user in response to a determination that the account exists in the cloud service. If the instance of the user account is deployed to the client computing device, the user may utilize the client computing device to access the data and/or services associated with the user account.

The user account may contain or otherwise be associated with various data. The data associated with the account may be stored by the cloud service. The data associated with the account may belong to at least one of a plurality of types of data. Some types of data may be sensitive in nature (e.g., has restricted access). Thus, the plurality of types of data may be associated with a plurality of security levels. The plurality of security levels may correspond to different security requirements that must be satisfied by a user in order for the user to gain access to the corresponding data.

At 706, it may be determined that a security requirement for one of the plurality of security levels corresponding to at least one of a plurality of types of data is satisfied. For example, it may be determined by the cloud service that a security requirement for one of the plurality of security of levels is satisfied based at least on the information (e.g., facial identification data) received from the computing device.

For example, it may be determined that a security requirement for accessing emergency data has been satisfied. Emergency data may be accessed on a name basis only. For example, the name of the user and/or a data file may be utilized to provide the user with access to the emergency data in the cloud service. As another example, it may be determined that a security requirement for accessing shared data has been satisfied. The shared data may be accessed using the facial identification data received at the computing device. At 708, the computing device may be authorized to access at least a subset of the data associated with the user account. For example, the client computing device used by the user may be authorized to access the data corresponding to the security level(s) for which the security requirement(s) have been satisfied.

Figure 8:
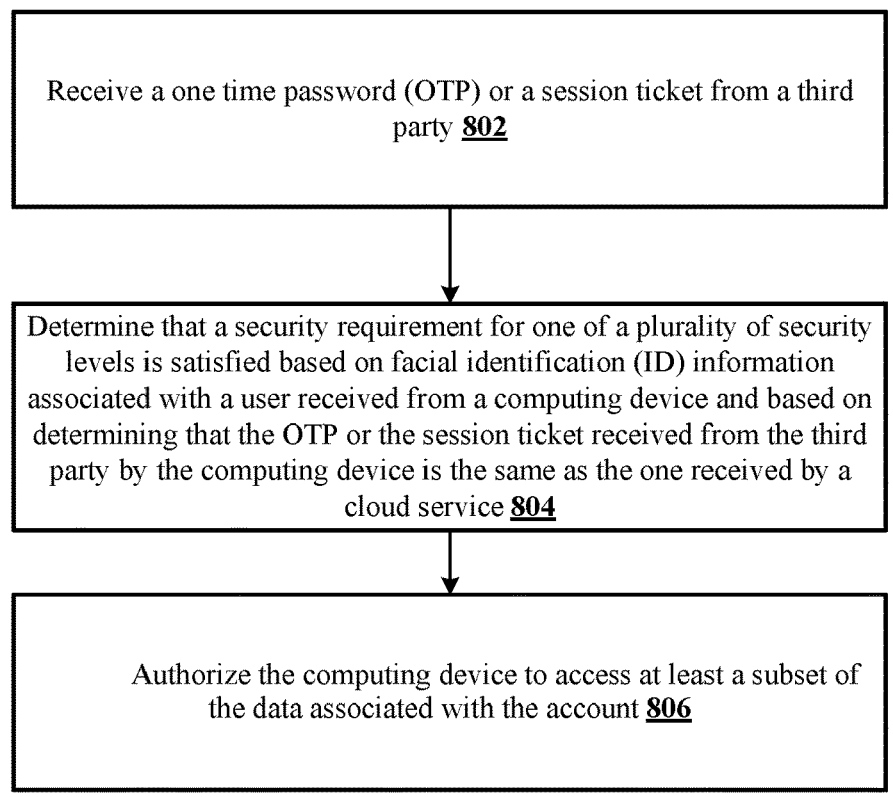
FIG. 8 illustrates another example process for accessing a user account in accordance with the present disclosure.

FIG. 8 illustrates an example process 800 performed by one or more components shown in the diagrams 100, 200, 300, 400, and/or 500. The process 800 may be performed to access a user account from any computing device. Although depicted as a sequence of operations in FIG. 8, those of ordinary skill in the art will appreciate that various embodiments may add, remove, reorder, or modify the depicted operations.

At 802, a one-time password (OTP) or a session ticket may be received from a third party. As described above, protected data associated with an account may be accessed using facial identification data received at a client computing device from which a user is trying to access the protected data and an OTP. The OTP may be generated by an independent third party (e.g., independent third party 414). The independent third party may be any automated service known to the remote service. For example, the independent third party may be a CCTV camera service. For example, the independent third party, such as the CCTV camera service, can identify a user associated with the user account by means of facial recognition software. The independent third party may automatically generate the OTP (without any user involvement) if the user is recognized. The independent third party may then send the OTP to both a cloud service that stores the protected data and the client computing device used by the user.

As also described above, sensitive data associated with a user account may be accessed using facial identification received at a computing device from which a user is trying to access the sensitive data and a session ticket. The session ticket may be generated by a trusted third party (e.g., trusted third party 412 or 512). For example, any bank office may play the role of the trusted third party. The user may visit any trusted third party and use an automated service (e.g., the ATM) and a human verification (e.g., bank personnel confirmation) to generate the session ticket. The trusted third party may then send the session ticket to both the cloud service and the user's computing device.

At 804, it may be determined that a security requirement for one of a plurality of security levels is satisfied based on facial identification information associated with a user received from a client computing device and based on determining that the OTP or the session ticket received from the third party by the client computing device is the same as the one received by a cloud service. The cloud service and the client computing device may interact with each other to determine whether they each receive the same OTP or session ticket from the independent third party or trusted third party, respectively. If it is determined that the cloud service and the client computing device used by the user received the same OTP or session ticket, the user may be given access to the protected data or sensitive data, respectively.

In embodiments, geolocation information may be used to determine the third party for verifying that the user has access to the protected data or sensitive data. For example, the user's computing device from which the user is trying to access the protected data or sensitive data may identify a current geolocation of the user. The geolocation may be shared with the cloud service. The cloud service may locate the nearest possible third party capable of providing an independent service of identification. For example, the cloud service may locate the nearest possible CCTV camera service and/or bank office. The nearest third party may find the user, or the user may visit the nearest third party, and the nearest third party may identify him or her on the basis of facial recognition. As another example, any other independent service of identification known to the cloud service may be used to verify the identity of the user.

At 806, the computing device may be authorized to access at least a subset of the data associated with the account. For example, the computing device may be authorized to access the data corresponding to the security level(s) for which the security requirement(s) have been satisfied.

FIG. 9 illustrates an example process 900 performed by one or more components shown in the diagrams 100, 200, 300, 400, and/or 500. The process 900 may be performed to access a user account from any computing device. Although depicted as a sequence of operations in FIG. 9, those of ordinary skill in the art will appreciate that various embodiments may add, remove, reorder, or modify the depicted operations.

As described above, facial identification associated with a user may be utilized to access an account of the user from any computing device associated with the user. For example, facial identification may be used to identify a corresponding user account. The user may use one or more cameras associated with any computing device to scan or take images of his or her facial features. Such facial features may be utilized to recognize the user. In some embodiments, geolocation and/or complimentary authentication services may additionally be utilized double check the identity of the user.

After the identity of the user is recognized, such as via facial identification, the user account corresponding to the user's identity may be identified. In embodiments, a corresponding user account instance is already available locally, and the user session may be initialized (e.g., started) locally on the computing device using the local user account instance. In other embodiments, the corresponding user account instance is not available locally. Thus, it may need to be determine if the user account exists in a remote service, such as in a cloud service. At 902, it may be determined whether an account of a user exists in a cloud service in response to receiving information (e.g., facial identification data) associated with the user from the computing device. For example, it may be determined if the account of the user exists in a storage of the cloud service. The cloud service may determine if the user account exists based on the facial identification data received from any computing device used by the user.

It may be determined that that the user account exists in the cloud service. For example, the cloud service may determine that a cloud-based container or VM associated with the user account exists in the cloud service. If the computing device determines that the user account exists in the cloud service, the cloud service may deploy an instance of the account to the client computing device used by the user. At 904, an instance of the account may be deployed to the client computing device in response to determining that the account exists in the cloud service. If the instance of the account is deployed to the client computing device, the user may utilize the client computing device to access the data and/or services associated with the user account.

The local container with the user account may exist temporarily on the computing device, such as until some threshold in time. At 906, temporary storage of the instance of the user account at the computing device may be caused. The threshold in time may vary. For example, the user account instance may remain available locally for 24 hours so that the user can use the same computing device during the same day. In another example, the user account instance may remain available locally for 7 days such that the user can use the same computing device during the week. Any other threshold of time may be suitable. At 908, deletion of the local instance of the account from the computing device may be caused after a predetermined amount of time has lapsed. In some embodiments, if the local container with the user account has not been used some time (e.g., for a day, for a week, for a month, etc.), then the local account instance may automatically be deleted.

Figure 10:
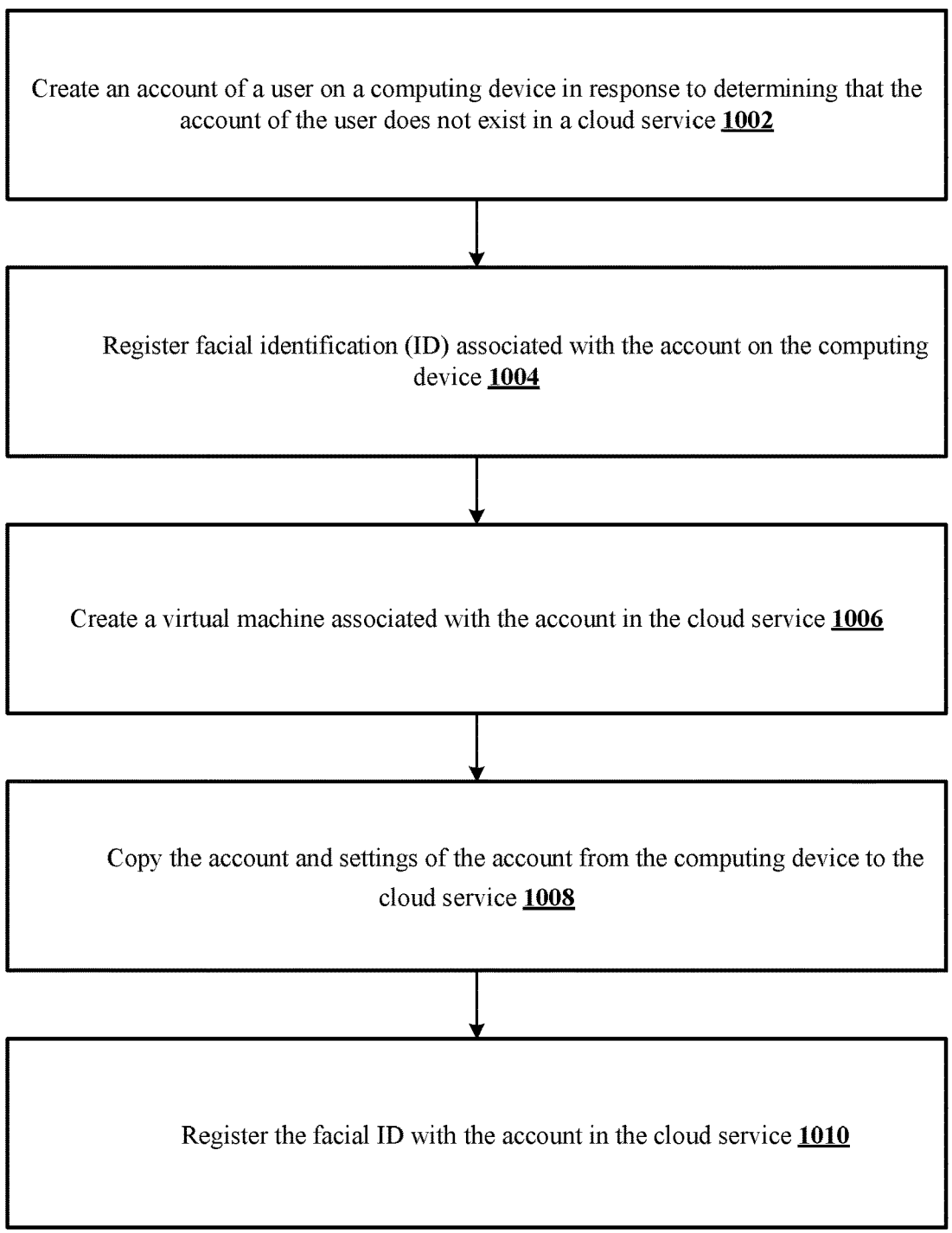
FIG. 10 illustrates another example process for accessing a user account in accordance with the present disclosure.

FIG. 10 illustrates an example process 1000 performed by one or more components shown in the diagrams 100, 200, 300, 400, and/or 500. The process 1000 may be performed to create a user account from any computing device. Although depicted as a sequence of operations in FIG. 10, those of ordinary skill in the art will appreciate that various embodiments may add, remove, reorder, or modify the depicted operations.

A user account associated with the user may not exist locally on a computing device or in a cloud service. This may occur if the user has never created an account on any device before. Alternatively, a user account associated with a user may not exist locally or in the cloud service even if the user has previously created a user account, but that user account has been lost, corrupted, stolen, and/or compromised. Thus, the user may need to create a new user account.

At 1002, an account of a user may be created on a computing device in response to determining that the account of the user does not exist in a cloud service. For example, the user may register and create an initial local user account on any computing device used by the user. At 1004, facial identification associated with the user account may be registered on the computing device. For example, the user may register his or her facial identification data, such as with the local user account. To register his or her facial identification data, the user, e.g., the user 302, may use one or more cameras associated with the computing device 304 to scan or take images of his or her facial features. Such facial features may later be utilized to recognize the user 302. Data associated with his or her facial features may be registered with the local user account.

The initial user account, along with its corresponding data and settings may be saved into the cloud service. At 1006, a virtual machine (VM) associated with the user account may be created in the cloud service. For example, a VM with the user account (or any other cloud-based container) may be created in the cloud service.

At 1008, the account and settings and/or data of the account may be copied from the computing device to the cloud service. For example, data and/or settings associated with the user account may be stored into the cloud instance of the user account. For example, the computing device may cause the initial local user account and its corresponding data/settings to be stored in a storage of the cloud service. At 1010, the facial identification with the account may be registered in the cloud service. For example, the facial identification data registered with the local user account may be registered with the cloud service. The created cloud-based container may be used for deployment of the local account with settings into any computing device.

Figure 11:
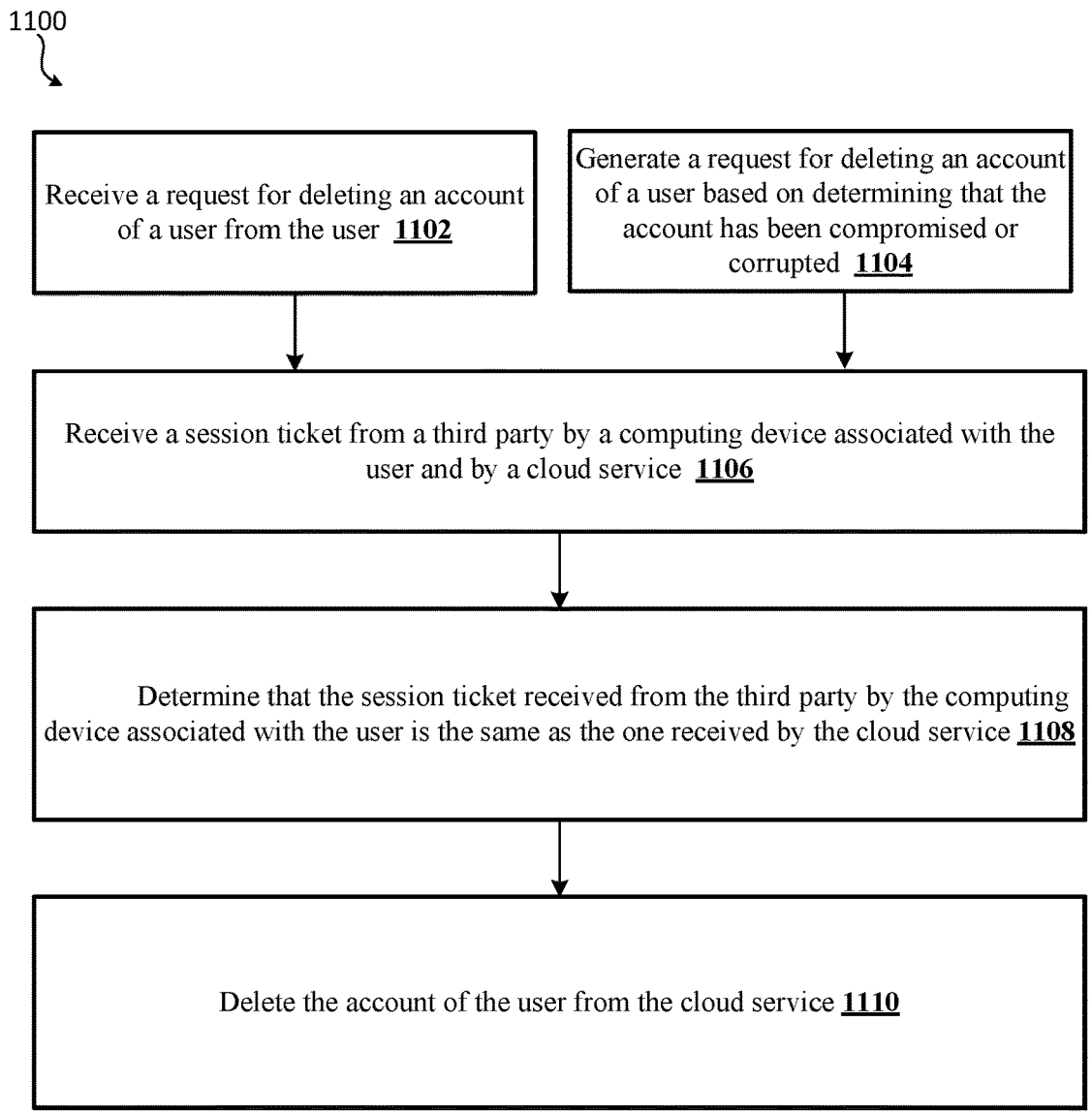
FIG. 11 illustrates another example process for accessing a user account in accordance with the present disclosure.

FIG. 11 illustrates an example process 1100 performed by one or more components shown in the diagrams 100, 200, 300, 400, and/or 500. The process 1100 may be performed to delete a user account from any computing device. Although depicted as a sequence of operations in FIG. 11, those of ordinary skill in the art will appreciate that various embodiments may add, remove, reorder, or modify the depicted operations.

A user account may be deleted from a cloud service, such as from any of the cloud services described above. For example, a user account may be deleted if the user associated with the user account wants to delete the user account. At 1102, a request for deleting an account of a user may be received from the user. As another example, a user account may be deleted from the cloud service if it is determined that the user account has been compromised and/or corrupted. At 1104, a request for deleting an account of a user may be generated based on determining that the account has been compromised or corrupted.

The user account may be deleted using, at least in part, information received from a third party (e.g., trusted third party 412 or 512). The user account may be deleted using a session ticket generated by a trusted third party, such as a bank. For example, the user associated with the user account may visit a trusted third party, such as any bank office, and use an automated service (e.g., the ATM) and a human verification (e.g., bank personnel confirmation) to generate a session ticket. The trusted third party may then send the session ticket to both the cloud service and a computing device of the user. At 1106, a session ticket may be received from a third party by a computing device associated with the user and by a cloud service.

The cloud service and the user's computing device may interact with each other to determine whether they each receive the same session ticket from the trusted third party. In embodiments, it may be determined that the session ticket received from the third party by the computing device is the same as the session ticket received from the third party by the cloud service. At 1108, it may be determined that the session ticket received from the third party by the computing device associated with the user is the same as the one received by the cloud service. If it is determined that the cloud service and the user's computing device received the same session ticket, the user account associated with the user may be deleted from the cloud service. At 1110, the account of the user may be deleted from the cloud service. For example, the cloud service may delete all data associated with the user account, including but not limited to emergency data, shared data, protected (e.g., private) data, and/or sensitive data. In other embodiments, it may be determined that the session ticket received from the third party by the computing device is not the same as the session ticket received from the third party by the cloud service. If the session ticket received from the third party by the cloud service is not the same as the session ticket received from the third party by the user's computing device, the user account associated with the user may not be deleted from the cloud service.

Figure 12:
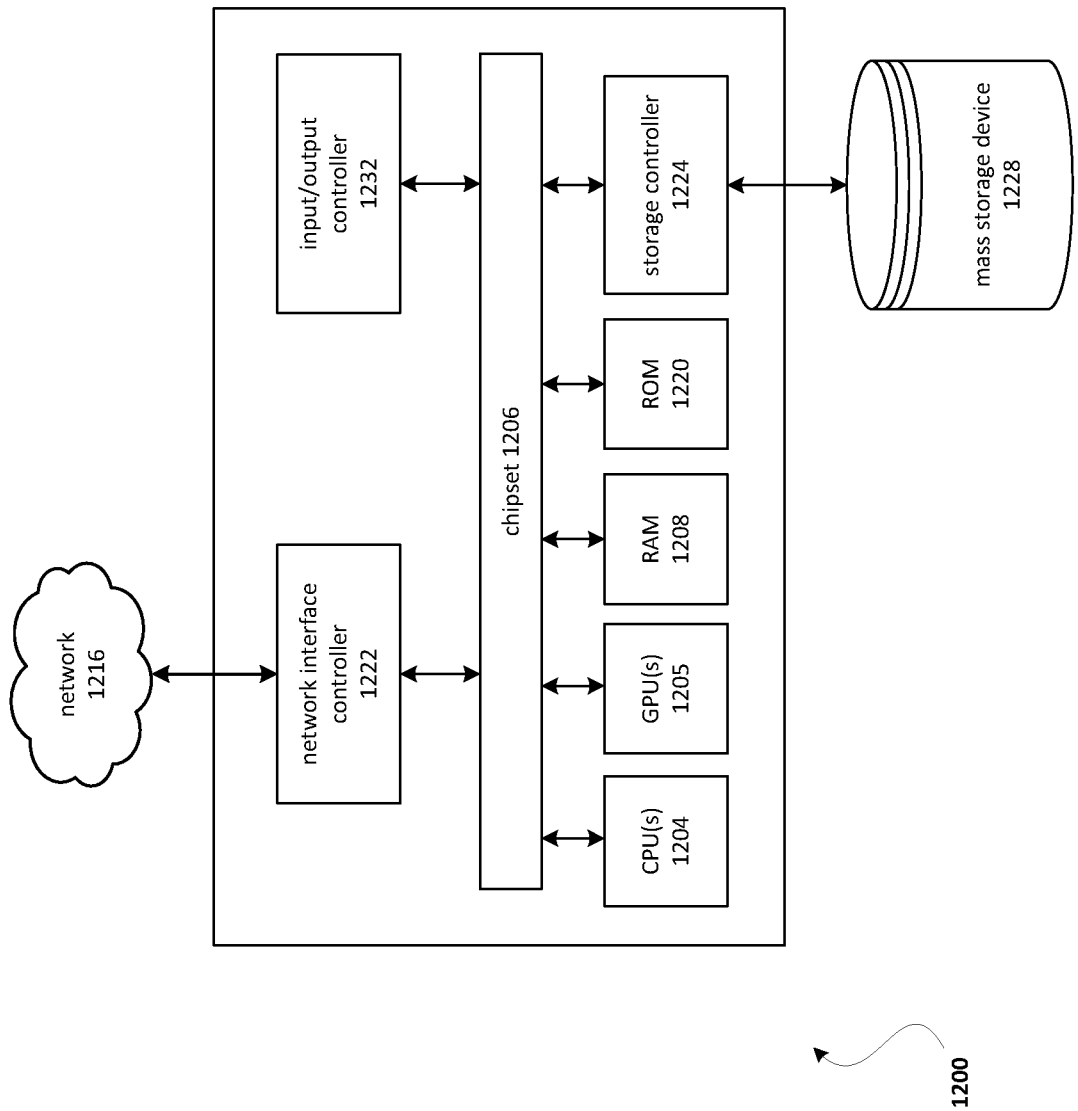
FIG. 12 illustrates an example computing device which may be used to perform any of the techniques disclosed herein.

FIG. 12 illustrates a computing device that may be used in various aspects, such as the services, networks, modules, and/or devices depicted in FIGS. 1-5. The computer architecture shown in FIG. 12 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1200 may include a baseboard, or "motherboard," which is a printed circuit board to which a multitude of components or devices may be connected by way of a system bus or other electrical communication paths. One or more central processing units (CPUs) 1204 may operate in conjunction with a chipset 1206. The CPU(s) 1204 may be standard programmable processors that perform arithmetic and logical operations necessary for the operation of the computing device 1200.

The CPU(s) 1204 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1204 may be augmented with or replaced by other processing units, such as GPU(s) 1205. The GPU(s) 1205 may comprise processing units specialized for but not necessarily limited to highly parallel computations, such as graphics and other visualization-related processing.

A chipset 1206 may provide an interface between the CPU(s) 1204 and the remainder of the components and devices on the baseboard. The chipset 1206 may provide an interface to a random-access memory (RAM) 1208 used as the main memory in the computing device 1200. The chipset 1206 may further provide an interface to a computer-readable storage medium, such as a read-only memory (ROM) 1220 or non-volatile RAM (NVRAM) (not shown), for storing basic routines that may help to start up the computing device 1200 and to transfer information between the various components and devices. ROM 1220 or NVRAM may also store other software components necessary for the operation of the computing device 1200 in accordance with the aspects described herein.

The computing device 1200 may operate in a networked environment using logical connections to remote computing nodes and computer systems through local area network (LAN). The chipset 1206 may include functionality for providing network connectivity through a network interface controller (NIC) 1222, such as a gigabit Ethernet adapter. A NIC 1222 may be capable of connecting the computing device 1200 to other computing nodes over a network 1216. It should be appreciated that multiple NICs 1222 may be present in the computing device 1200, connecting the computing device to other types of networks and remote computer systems.

The computing device 1200 may be connected to a mass storage device 1228 that provides non-volatile storage for the computer. The mass storage device 1228 may store system programs, application programs, other program modules, and data, which have been described in greater detail herein. The mass storage device 1228 may be connected to the computing device 1200 through a storage controller 1224 connected to the chipset 1206. The mass storage device 1228 may consist of one or more physical storage units. The mass storage device 1228 may comprise a management component 1212. A storage controller 1224 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1200 may store data on the mass storage device 1228 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1228 is characterized as primary or secondary storage and the like.

For example, the computing device 1200 may store information to the mass storage device 1228 by issuing instructions through a storage controller 1224 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1200 may further read information from the mass storage device 1228 by detecting the physical states or characteristics of one or more particular locations within the physical storage units.

In addition to the mass storage device 1228 described above, the computing device 1200 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1200.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1228 depicted in FIG. 12, may store an operating system utilized to control the operation of the computing device 1200. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1228 may store other system or application programs and data utilized by the computing device 1200.

The mass storage device 1228 or other computer-readable storage media may also be encoded with computer-executable instructions, which, when loaded into the computing device 1200, transforms the computing device from a general-purpose computing system into a special-purpose computer capable of implementing the aspects described herein. These computer-executable instructions transform the computing device 1200 by specifying how the CPU(s) 1204 transition between states, as described above. The computing device 1200 may have access to computer-readable storage media storing computer-executable instructions, which, when executed by the computing device 1200, may perform the methods described herein.

A computing device, such as the computing device 1200 depicted in FIG. 12, may also include an input/output controller 1232 for receiving and processing input from a number of input devices, such as a keyboard, a mouse, a touchpad, a touch screen, an electronic stylus, or other type of input device. Similarly, an input/output controller 1232 may provide output to a display, such as a computer monitor, a flat-panel display, a digital projector, a printer, a plotter, or other type of output device. It will be appreciated that the computing device 1200 may not include all of the components shown in FIG. 12, may include other components that are not explicitly shown in FIG. 12, or may utilize an architecture completely different than that shown in FIG. 12.

As described herein, a computing device may be a physical computing device, such as the computing device 1200 of FIG. 12. A computing node may also include a virtual machine host process and one or more virtual machine instances. Computer-executable instructions may be executed by the physical hardware of a computing device indirectly through interpretation and/or execution of instructions stored and executed in the context of a virtual machine.

Any and all user data, including user data used for facial recognition and/or facial identification, described herein is used with the authorization of the user. For example, no facial recognition or identification data is gathered from users without the users consenting to such facial recognition or identification data being gathered.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described above with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate.

For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc.

Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method, comprising:
    determining whether an account of a user exists in a cloud service in response to receiving information associated with the user from a computing device, wherein the computing device is any computing device associated with the user, wherein data associated with the account are stored by the cloud service, wherein there are a plurality of types of data associated with a plurality of security levels, wherein the plurality of security levels correspond to different security requirements, and wherein the data associated with the account belong to at least one of the plurality of types of data;
    deploying an instance of the account to the computing device in response to determining that the account exists in the cloud service, wherein the instance of the account enables the user to access services via the computing device;
    wherein the method further comprises:
    determining that a security requirement for one of the plurality of security levels corresponding to the at least one of the plurality of types of data is satisfied based on the information received from the computing device and information received from a third party, wherein the information received from the third party comprises a one time password (OTP) or a session ticket;
    determining that the security requirement for the one of the plurality of security levels is satisfied based at least in part on determining that the OTP or the session ticket received from the third party by the computing device is the same as the one received by the cloud service; and
    authorizing the computing device to access at least a subset of the data associated with the account.

2. The method of claim 1, wherein the information received from the computing device comprises facial identification information associated with the user, wherein the facial identification information is registered with the cloud service.

3. The method of claim 1, further comprising:
    causing to temporarily store the instance of the account at the computing device; and
    causing to delete the instance of the account after a predetermined amount of time has lapsed.

4. The method of claim 1, further comprising:
    deleting the account of the user from the cloud service in response to determining that the account of the user has been compromised or corrupted.

5. The method of claim 4, further comprising:
    deleting the account of the user based at least in part on information received from a third party, wherein the information received from the third party comprises a session ticket.

6. The method of claim 1, further comprising:
    creating a user account in the cloud service in response to determining that the account of the user does not exist in the cloud service.

7. A system comprising:
    at least one processor; and
    at least one memory comprising computer-readable instructions that upon execution by the at least one processor cause the system to perform operations comprising:
    determining whether an account of a user exists in a cloud service in response to receiving information associated with the user from a computing device, wherein the computing device is any computing device associated with the user, wherein data associated with the account are stored by the cloud service, wherein there are a plurality of types of data associated with a plurality of security levels, wherein the plurality of security levels correspond to different security requirements, and wherein the data associated with the account belong to at least one of the plurality of types of data;

deploying an instance of the account to the computing device in response to determining that the account exists in the cloud service, wherein the instance of the account enables the user to access services via the computing device;

wherein the operations further comprise:

determining that a security requirement for one of the plurality of security levels corresponding to the at least one of the plurality of types of data is satisfied based on the information received from the computing device and information received from a third party, wherein the information received from the third party comprises a one time password (OTP) or a session ticket;

determining that the security requirement for the one of the plurality of security levels is satisfied based at least in part on determining that the OTP or the session ticket received from the third party by the computing device is the same as the one received by the cloud service; and authorizing the computing device to access at least a subset of the data associated with the account.

8. The system of claim 7, wherein the information received from the computing device comprises facial identification information associated with the user, wherein the facial identification information is registered with the cloud service.

9. The system of claim 7, the operations further comprising:

causing to temporarily store the instance of the account at the computing device; and causing to delete the instance of the account after a predetermined amount of time has lapsed.

10. The system of claim 7, the operations further comprising:

deleting the account of the user from the cloud service in response to determining that the account of the user has been compromised or corrupted.

11. The system of claim 10, the operations further comprising:

deleting the account of the user based at least in part on information received from a third party, wherein the information received from the third party comprises a session ticket.

12. The system of claim 7, the operations further comprising:

creating a user account in the cloud service in response to determining that the account of the user does not exist in the cloud service.

13. A non-transitory computer-readable storage medium, storing computer-readable instructions that upon execution by a processor cause the processor to implement operations, the operations comprising:

determining whether an account of a user exists in a cloud service in response to receiving information associated with the user from a computing device, wherein the computing device is any computing device associated with the user, wherein data associated with the account are stored by the cloud service, wherein there are a plurality of types of data associated with a plurality of security levels, wherein the plurality of security levels correspond to different security requirements, and wherein the data associated with the account belong to at least one of the plurality of types of data;

deploying an instance of the account to the computing device in response to determining that the account exists in the cloud service, wherein the instance of the account enables the user to access services via the computing device;

wherein the operations further comprise:

determining that a security requirement for one of the plurality of security levels corresponding to the at least one of the plurality of types of data is satisfied based on the information received from the computing device and information received from a third party, wherein the information received from the third party comprises a one time password (OTP) or a session ticket;

determining that the security requirement for the one of the plurality of security levels is satisfied based at least in part on determining that the OTP or the session ticket received from the third party by the computing device is the same as the one received by the cloud service; and authorizing the computing device to access at least a subset of the data associated with the account.

14. The non-transitory computer-readable storage medium of claim 13, wherein the information received from the computing device comprises facial identification information associated with the user, wherein the facial identification information is registered with the cloud service.

15. The non-transitory computer-readable storage medium of claim 13, the operations further comprising:

causing to temporarily store the instance of the account at the computing device; and causing to delete the instance of the account after a predetermined amount of time has lapsed.

16. The non-transitory computer-readable storage medium of claim 13, the operations further comprising:

deleting the account of the user from the cloud service in response to determining that the account of the user has been compromised or corrupted.

17. The non-transitory computer-readable storage medium of claim 13, the operations further comprising:

creating a user account in the cloud service in response to determining that the account of the user does not exist in the cloud service.

* * * * *